(12) United States Patent
Zhu et al.

(10) Patent No.: US 10,983,300 B2
(45) Date of Patent: Apr. 20, 2021

(54) LENS DRIVING APPARATUS

(71) Applicant: AAC Technologies Pte. Ltd., Singapore (SG)

(72) Inventors: Bingke Zhu, Shenzhen (CN); Kaiyan Gao, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 184 days.

(21) Appl. No.: 16/236,500

(22) Filed: Dec. 30, 2018

(65) Prior Publication Data
US 2019/0302396 A1 Oct. 3, 2019

(30) Foreign Application Priority Data

Mar. 27, 2018 (CN) .......................... 201810259208.3

(51) Int. Cl.
*G02B 7/02* (2021.01)
*G02B 7/04* (2021.01)
*F03G 7/06* (2006.01)
*H02N 10/00* (2006.01)

(52) U.S. Cl.
CPC ............... *G02B 7/04* (2013.01); *F03G 7/065* (2013.01); *H02N 10/00* (2013.01)

(58) Field of Classification Search
CPC G02B 7/003–005; G02B 7/0023; G02B 7/04; G02B 7/026; G02B 7/08; F03G 7/065
See application file for complete search history.

(56) References Cited

U.S. PATENT DOCUMENTS

2017/0285443 A1* 10/2017 Hu .......................... G03B 5/04

FOREIGN PATENT DOCUMENTS

WO WO-2010061789 A1 * 6/2010 ............... G02B 7/08

* cited by examiner

*Primary Examiner* — Alicia M Harrington
(74) *Attorney, Agent, or Firm* — IPro, PLLC; Na Xu

(57) ABSTRACT

The present disclosure provides a lens driving apparatus. The lens driving apparatus includes a base, a barrel, two elastic members sandwiched between the barrel and the base, and a conductive wire connecting the two elastic members to form a current loop with the two elastic members. The base includes a pedestal and a conductive terminal embedded in the pedestal and electrically connected to outside. The two elastic members are electrically connected with the conductive terminal for driving the barrel to reciprocate in a direction of an optical axis. At least one of the two elastic members is made of memory alloys.

7 Claims, 10 Drawing Sheets

LENS DRIVING APPARATUS

CROSS-REFERENCE TO RELATED APPLICATIONS

The present application claims priority to Chinese Patent Application No. 201810259208.3, filed on Mar. 27, 2018, the content of which is incorporated herein by reference in its entirety.

TECHNICAL FIELD

The present disclosure relates to a driving apparatus, and more particularly to a lens driving apparatus.

BACKGROUND

With the development of photographic technology, lens driving apparatuses have been widely applied in various photographic devices. Combinations of lens driving apparatuses with various portable electronic devices such as mobile phones, cameras and computers are get favored by consumers.

In the related art, a driver in a lens driving apparatus is typically a driving structure formed by a coil and a magnet. The coil and the magnet are fixed on a barrel and a housing, respectively and the barrel is supported by the housing via an elastic sheet. When a current is applied to the coil, the coil and the magnet generate an electromagnetic field. The coil, subject to an electromagnetic force, drives the magnet to move along a straight line, which in turn causes the barrel to move in a direction of an optical axis.

However, in the related art, the barrel moves subject to the electromagnetic force, which is vulnerable to interference of a magnetic field. An additional Hall element is required to detect shaking of the barrel. It may have a low reliability in some special circumstances.

There is thus a need for an improved lens driving apparatus to solve the above problem.

BRIEF DESCRIPTION OF DRAWINGS

In order to explain the solutions according to the embodiments of the present disclosure more clearly, the figures used in the description of the embodiments will be introduced briefly below. Obviously, the following figures only illustrate some of the embodiments of the present disclosure. Other figures can be obtained by those having ordinary skill in the art from these figures without any inventive efforts. In the figures.

DESCRIPTION OF EMBODIMENTS

In the following, the solutions according to the embodiments of the present disclosure will be described clearly and fully with reference to the figures. Obviously, the embodiments described below are only some, rather than all, of the embodiments of the present disclosure. All other embodiments that can be obtained by those skilled in the art from the embodiments described below without any inventive efforts are to be encompassed by the scope of the present disclosure.

First Embodiment

Figure 1:
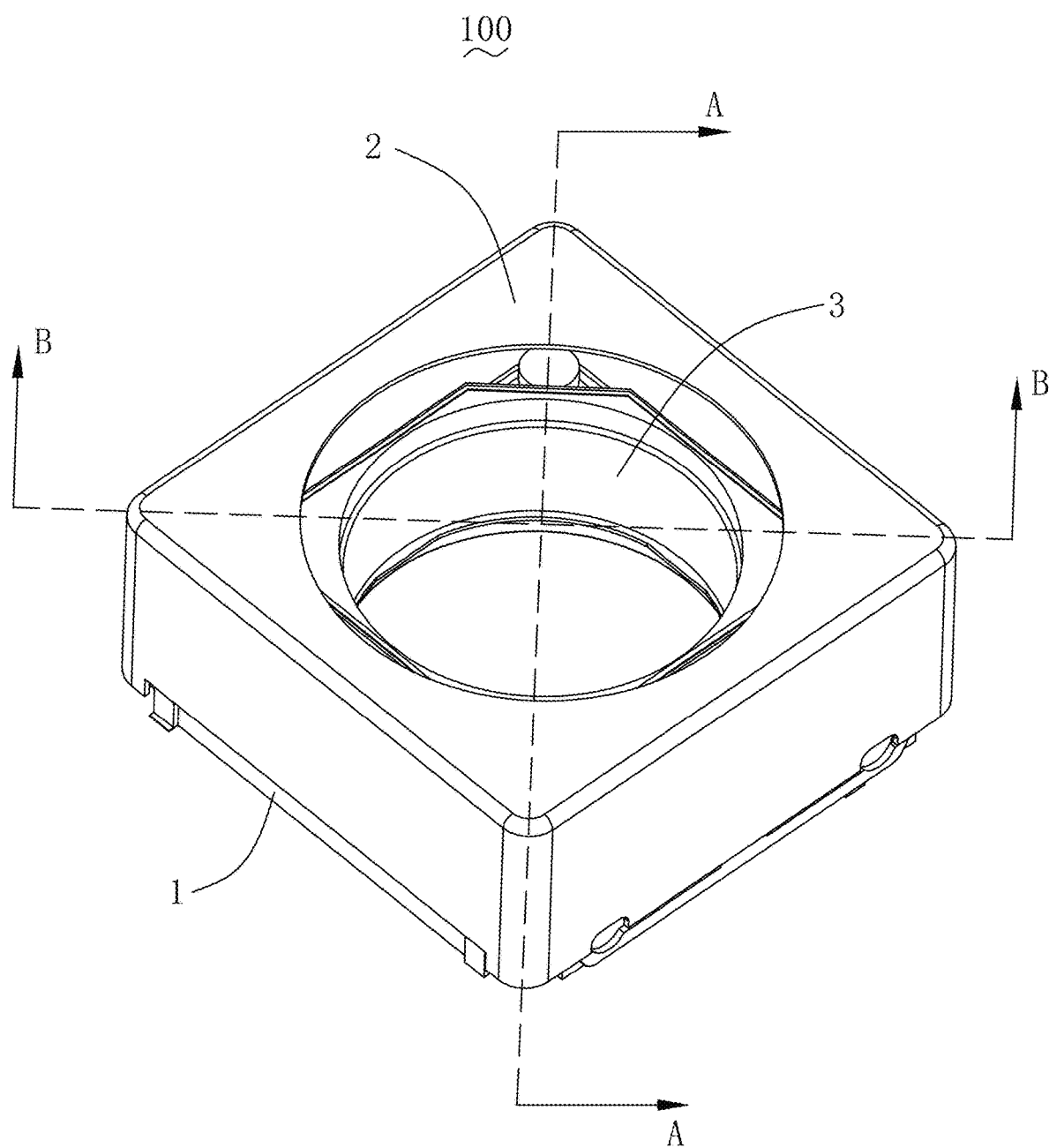
FIG. 1 is a structural perspective schematic diagram of a lens driving apparatus of the present disclosure.
Figure 2:
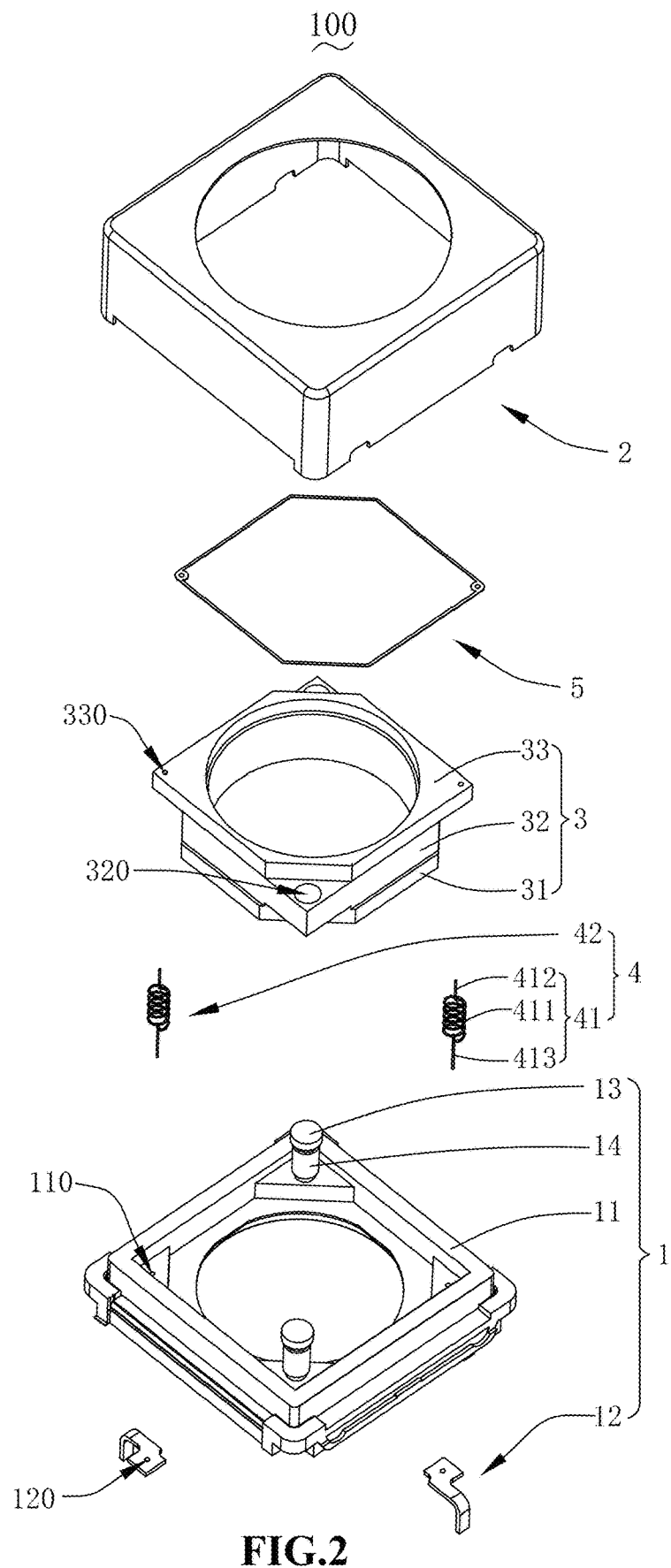
FIG. 2 is an exploded structural schematic diagram of the lens driving apparatus of the present disclosure.
Figure 3:
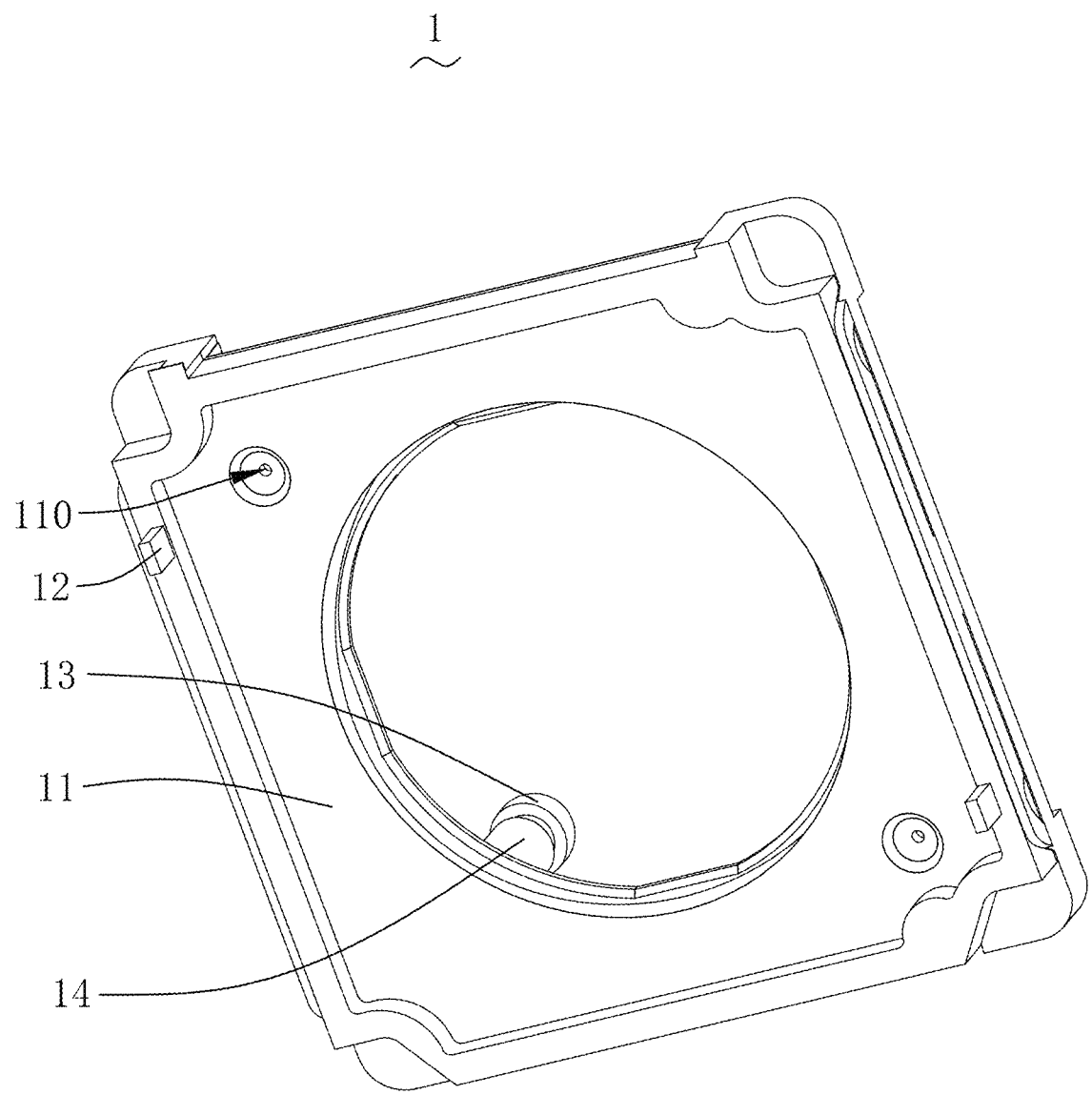
FIG. 3 is a structural schematic diagram of a base shown in FIG. 1 from another angle.
Figure 4:
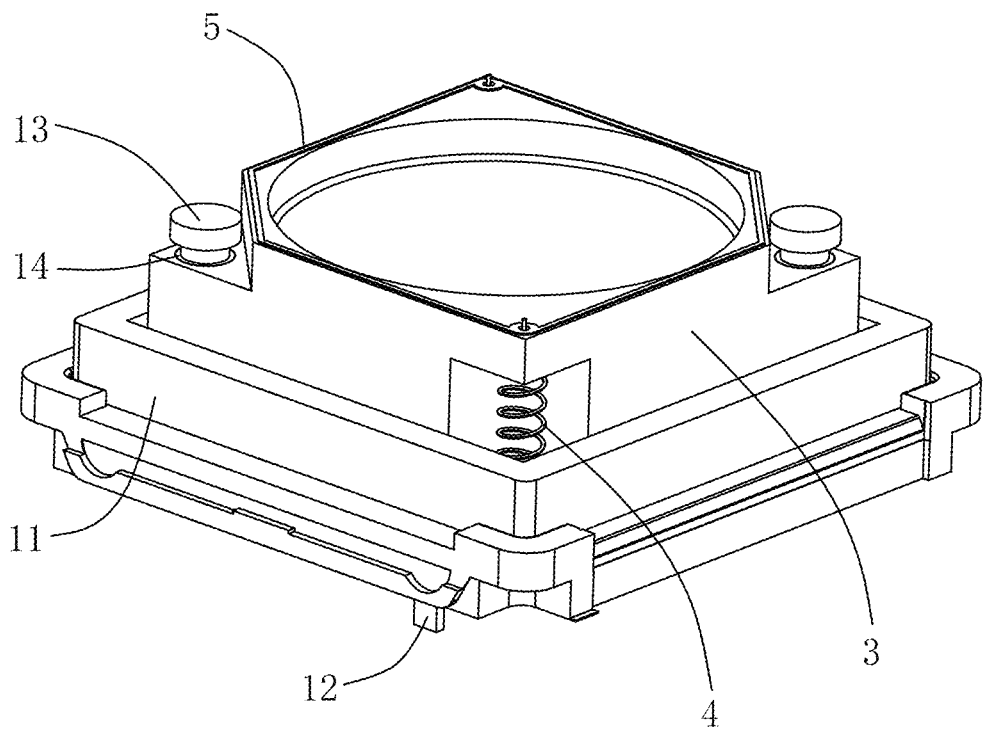
FIG. 4 is a structural schematic diagram of the lens driving apparatus shown in FIG. 1, with an upper cover removed.
Figure 5:
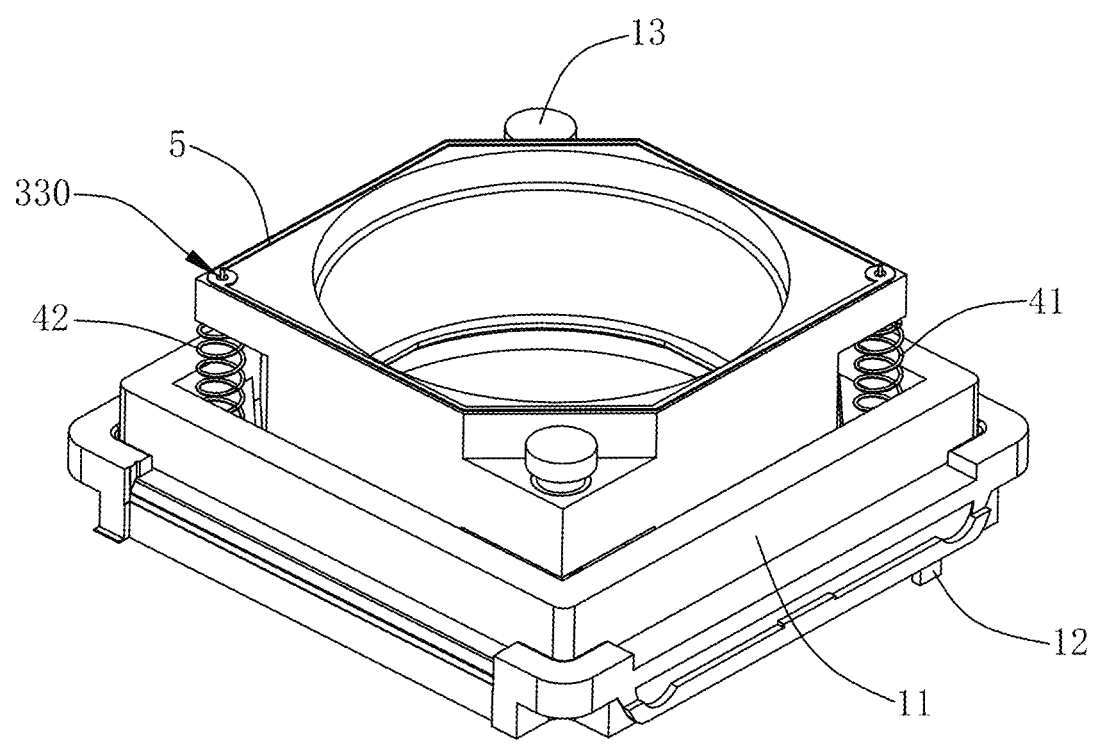
FIG. 5 is a schematic diagram of the perspective structure shown in FIG. 4 from another angle.
Figure 6:
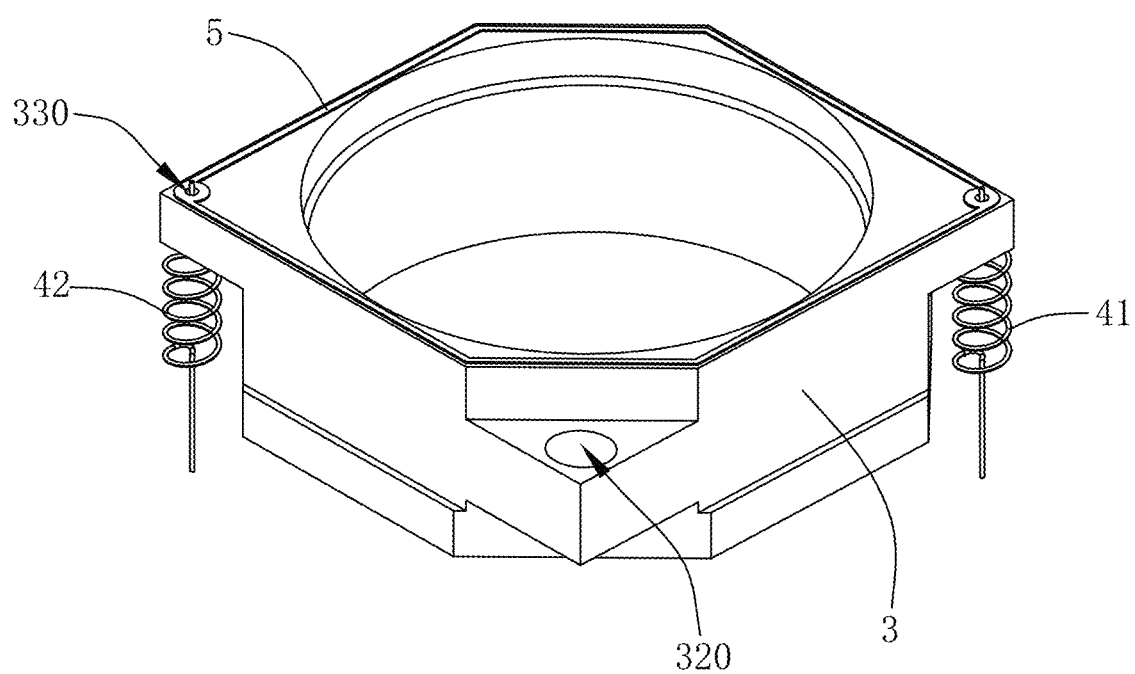
FIG. 6 is a schematic diagram showing a mating structure of a barrel and an elastic member shown in FIG. 2.
Figure 7:
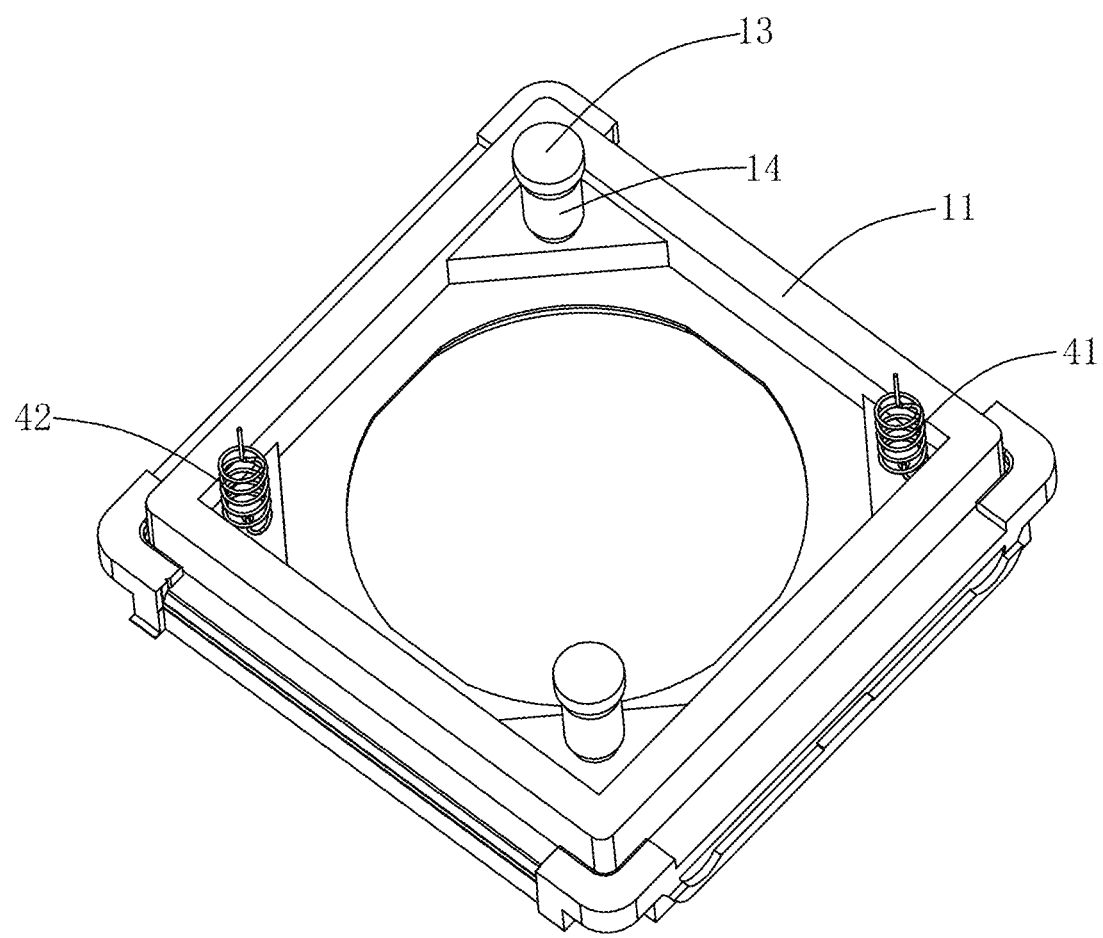
FIG. 7 is a schematic diagram showing a mating structure of a base and the elastic member shown in FIG. 2.
Figure 8:
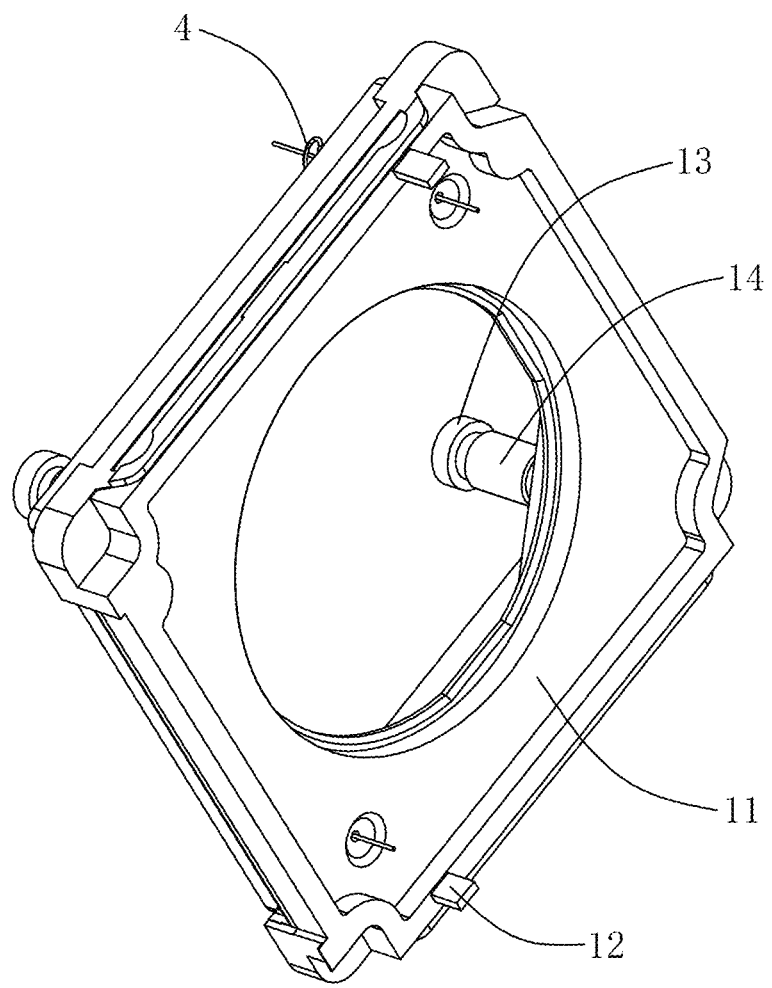
FIG. 8 is a schematic diagram of the mating structure shown in FIG. 7 from another angle.
Figure 9:
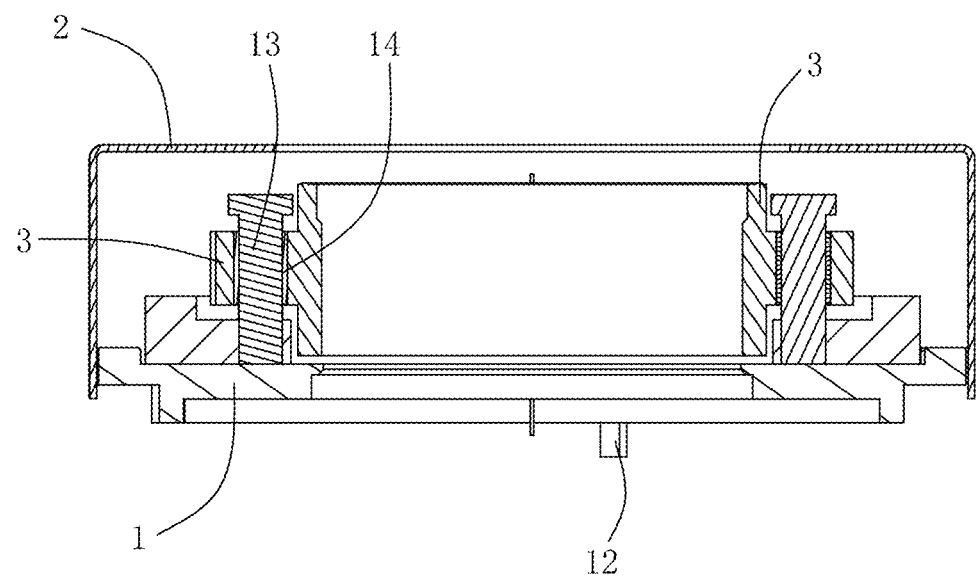
FIG. 9 is a cross-sectional diagram of the lens driving apparatus of FIG. 1 taken along line A-A.
Figure 10:
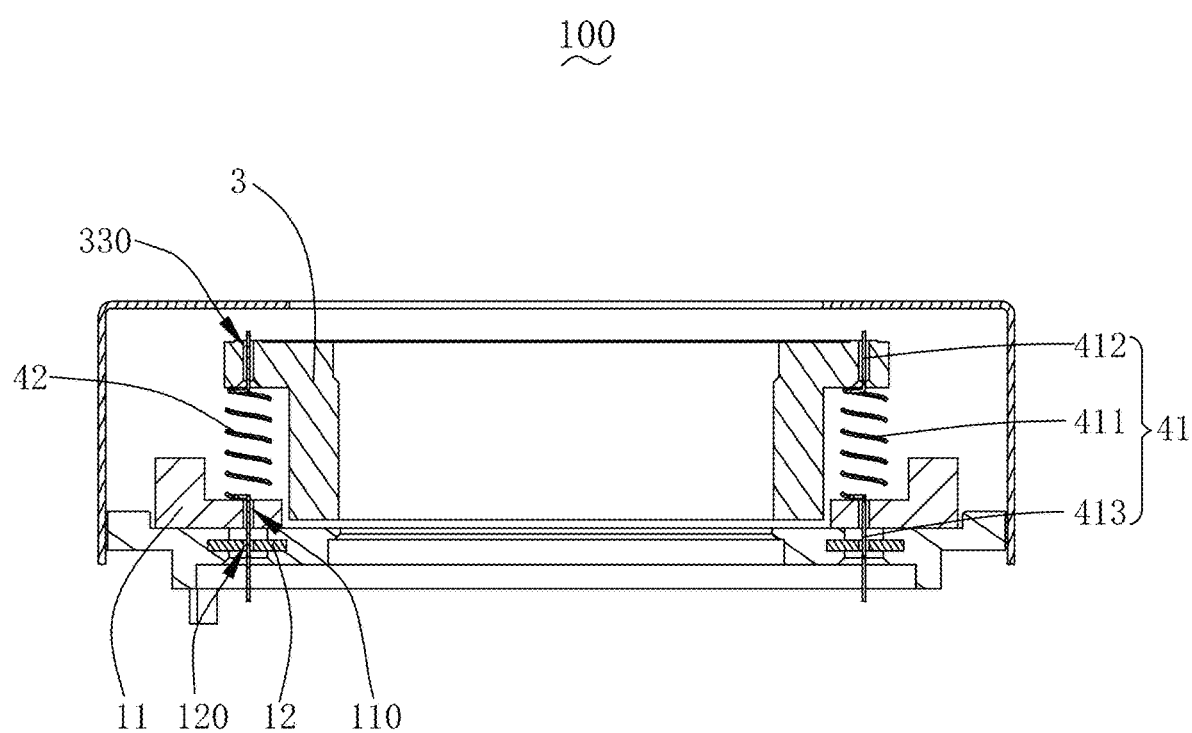
FIG. 10 is a cross-sectional diagram of the lens driving apparatus of FIG. 1 taken along line B-B.

Referring to FIGS. 1-3, the present disclosure provides a lens driving apparatus 100 including a base 1, an upper cover 2 that covers and fits the base 1 to form an accommodating space, a barrel 3 accommodated in the accommodating space, two elastic members 4 sandwiched between the base 1 and the barrel 3, and a conductive wire 5 connecting the two elastic members 4.

The base 1 includes a pedestal 11, a conductive terminal 12 having one end embedded in the pedestal 11 and the other end electrically connected with outside, a guiding pole 13 fixed at a side of the pedestal 11 close to the barrel 3 and arranged along a direction of an optical axis, and a metal sleeve 14 sleeved on an outer surface of the guiding pole 13.

The conductive terminal 12 includes a first through hole 120 penetrating therethrough in the direction of the optical axis. The pedestal 11 includes a second through hole 110 penetrating through the pedestal 11 and provided to be corresponding to the position of the first through hole 120. The guiding pole 13 and the pedestal 11 are fixed together by glue or formed in one piece by means of injection molding, and the metal sleeve 14 and the barrel 3 are formed in one piece by means of injection molding. As an example, the number of the conductive terminals 12 is two, and correspondingly, the numbers of the first through holes 120 and the second through holes 110 are also two.

The upper cover 2 covers and fits the base 1 to form an accommodating space for accommodating and protecting the barrel 3.

The barrel 3 has an annular shape and is accommodated in the accommodating space, and is disposed to be opposite to and spaced apart from the base 1 and the upper cover 2. The barrel 3 includes a first barrel wall 31 opposite to and spaced apart from the base 1, and a second barrel wall 32 fixed to a side of the first barrel wall 31 away from the base 1, and a third barrel wall 33 fixed to a side of the second barrel wall 32 away from the first barrel wall 31 and disposed to be opposite to and spaced apart from the upper cover 2. The first barrel wall 31, the second barrel wall 32 and the third barrel wall 33 are formed in one piece.

The second barrel wall 32 includes a guiding hole 320 penetrating therethrough in the direction of the optical axis, and the third barrel wall 33 is provided with a third through hole 330 penetrating through the third barrel wall 33 and disposed to be corresponding to the position of the first through hole 120. As an example, the central axes of the first through hole 120, the second through hole 110, and the third through hole 330 are in the same straight line. The metal sleeve 14 is fixedly attached to a hole wall of the guiding hole 320. A surface of the metal sleeve 14 that is attached to the guiding pole 13 is a smooth surface and has a small frictional resistance, which can reduce energy loss when the barrel 3 is moving. Moreover, the metal sleeve 14 can strengthen the strength of the guide hole 320 and extend the service life of the lens driving apparatus 100.

Referring to FIGS. 4-10, it can be understood that the barrel wall 3 is movably connected with the base 1 through a mating structure of the guiding hole 320 and the guiding pole 13, and the guiding pole 13 is disposed in the direction of the optical axis, thereby limiting displacement of the barrel wall 3 in other directions and improving the reliability of the lens driving apparatus 100.

Further, the number of the guiding poles 13 is two, and the two guiding poles 13 are symmetrically disposed along the optical axis at corners of the lens driving apparatus 100. This can ensure the balance at the time when the barrel 3 is moving, and further enhance the optical performance of the lens driving apparatus 100.

The elastic member 4 is sandwiched between the base 1 and the barrel 3 for elastically supporting the barrel 3. The elastic member 4 includes a first elastic member 41 and a second elastic member 42. The first elastic member 41 is made of a unidirectional memory alloy, and the second elastic member 42 is made of a conventional elastic material. When currents are applied to the first elastic member 41, the temperature of the first elastic member 41 rises due to the thermal effect, and contraction starts under the action of the one-way shape memory effect, driving the barrel 3 to move towards the base 1. At this time, the second elastic member 42 is compressed. When the currents decrease or stop, the temperature of the first elastic member 41 decreases, and the first elastic member 41 maintains a memory state of a high temperature phase state. The compressed second elastic member 42 restores to an initial state under the action of the elastic potential energy, driving the barrel 3 to move away from the base 1 to the initial position, and therefore the first elastic member 41 also restores to the initial position under the tensile force. By adjusting the magnitude of the input current, the elastic member 4 is caused to drive the barrel 3 to reciprocate in the direction of the optical axis, thereby achieving a focusing operation. Further, the first elastic member 41 exhibits different electric resistances at different temperatures, so that an input of the current can be controlled by the feedback of the external resistance in order to achieve controlling of the position of the barrel 3. The operation is simple and of strong controllability.

Referring to FIG. 2 again, the first elastic member 41 is a coil spring, and includes: a spring body 411, and a first extending portion 412 and a second extending portion 413 extending from the spring body 411 to both sides in the direction of the optical axis. The first extending portion 412 passes through the third through hole 330 to be fixedly connected with the third cylindrical wall 33, that is, the first extending portion 412 is fixedly connected with the barrel 3. The second extending portion 413 sequentially passes through the second through hole 110 and the first through hole 120 to be is electrically connected with the conductive terminal 12. It can be understood that the second elastic member 42 can also be a coil spring and have the same structure as that of the first elastic member 41.

As an example, the first elastic member 41 and the second elastic member 42 are symmetrically disposed along the optical axis at corners of the lens driving apparatus 100. Further, the two elastic members 4 can be located at corners of the lens driving apparatus 100 which are different from the corners where the two guiding poles 13 are located, that is, the elastic members 4 and the guiding poles 13 are sequentially arranged in an annular array along the optical axis, thereby ensuring equilibrium of the force subjected by the barrel 3 and further enhancing the balance when the barrel 3 is moving.

The conductive wire 5 connects the two elastic members 4 for forming a current loop with the two elastic members 4. It is understood that the conductive wire 5 connects the two first extending portions 412. As an example, the conductive wire 5 can be fixedly connected with the barrel 3 by means of Laser Direct Structuring (LDS), such that the conductive wire 5 does not add to the thickness of the barrel 3 in the direction of the optical axis. In this way, the lens driving apparatus 100 can be made thinner which facilitates the miniaturization of the product. Further, the LDS process can be applied in batch processing.

Second Embodiment

Compared with the first embodiment, the distinguishing technical feature of the present embodiment will be described as follows.

The first elastic member and the second elastic member are both made of a bidirectional memory alloy. When currents are applied to the first elastic member and the second elastic member, the temperatures of the first elastic member and the second elastic member rise due to the thermal effect, and contraction starts under the action of the shape memory effect, driving the barrel 3 to move towards the base 1. When the currents decrease or stop, the temperatures of the first elastic member and the second elastic member decrease, and the first elastic member and the second elastic member restore to the initial state, driving the barrel 3 to move away from the base 1 to the initial position. It can be understood that the first elastic member and the second elastic member are connected in series, and after being applied with currents, a consistent motion state can be maintained for the first elastic member and the second elastic member, thereby smoothly driving the barrel to move.

Compared with the related art, by driving the barrel 3 to reciprocate in the direction of the optical axis with the elastic member 4 made of a memory alloy, the lens driving apparatus 100 provided by the present disclosure does not require a conventional voice coil and magnet to perform the driving, and there is no magnetic field interference problem, so that the stability is high. Moreover, the lens driving apparatus 100 has a simple structure and is easy to assemble, and moreover, it does not require an additional Hall element, and a precise closed-loop control can be achieved based on its own resistance change.

While the embodiments of the present disclosure have been described above, various modifications can be made by those skilled in the art without departing from the principle of the present disclosure. These modifications are to be encompassed by the scope of the present disclosure.

What is claimed is:
1. A lens driving apparatus, comprising:
   a base comprising a pedestal and a conductive terminal, the conductive terminal having one end embedded in the pedestal and another end electrically connected with outside;
   an upper cover that covers the base to form an accommodating space;
   a barrel accommodated in the accommodating space; wherein the barrel comprises a first barrel wall disposed to be opposite to and spaced apart from the base, a second barrel wall fixed to a side of the first barrel wall away from the base, and a third barrel wall fixed to a side of the second barrel wall away from the first barrel wall and disposed to be opposite to and spaced apart from the upper cover, and the first barrel wall, the second barrel wall and the third barrel wall are formed in one piece;

two elastic members sandwiched between the barrel and the base, the two elastic members being electrically connected with the conductive terminal for driving the barrel to reciprocate in a direction of an optical axis, wherein at least one of the two elastic members is made of memory alloys; and one of the two elastic members is a coil spring, and the coil spring comprises: a spring body, and a first extending portion and a second extending portion extending from the spring body towards both sides in the direction of the optical axis, the first extending portion being fixedly connected with the barrel, and the second extending portion being electrically connected with the conductive terminal, and the conductive terminal comprises a first through hole penetrating therethrough in the direction of the optical axis, the pedestal comprises a second through hole disposed to be corresponding to a position of the first through hole, the second extending portion sequentially passes through the second through hole and the first through hole to be electrically connected with the conductive terminal;

a conductive wire connecting the two elastic members to form a current loop with the two elastic members.

2. The lens driving apparatus as described in claim 1, wherein the two elastic members are disposed at corners of the lens driving apparatus along the optical axis.

3. The lens driving apparatus as described in claim 1, wherein the conductive wire is fixedly connected with the barrel.

4. The lens driving apparatus as described in claim 1, wherein the second barrel wall comprises a guiding hole penetrating therethrough in the direction of the optical axis, and the base further comprises: one or more guiding poles fixed at a side of the pedestal close to the barrel and arranged along the direction of an optical axis; and a metal sleeve sleeved on an outer surface of each of the one or more guiding poles and fixedly attached to an inner wall of the guiding hole.

5. The lens driving apparatus as described in claim 4, wherein the one or more guiding poles and the pedestal are fixed together by glue or formed in one piece by means of injection molding, and the metal sleeve and the second barrel wall are formed in one piece by means of injection molding.

6. The lens driving apparatus as described in claim 5, wherein the one or more guiding poles comprise two guiding poles, and the two guiding poles are symmetrically disposed
along the optical axis at corners of the lens driving apparatus.

7. The lens driving apparatus as described in claim 4, wherein the one or more guiding poles comprise two guiding poles, and the two guiding poles are symmetrically disposed along the optical axis at corners of the lens driving apparatus.

* * * * *